United States Patent
Li et al.

(10) Patent No.: US 9,843,514 B2
(45) Date of Patent: Dec. 12, 2017

(54) PACKET PROCESSING METHOD AND BACKGROUND SERVER

(71) Applicant: Tencent Technology (Shenzhen) Company Limited, Shenzhen, Guangdong (CN)

(72) Inventors: Wenzheng Li, Guangdong (CN); Zhiwu Chen, Guangdong (CN); Zhongfei Wang, Guangdong (CN); Lirong Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 202 days.

(21) Appl. No.: 14/750,654

(22) Filed: Jun. 25, 2015

(65) Prior Publication Data
US 2015/0295823 A1   Oct. 15, 2015

Related U.S. Application Data

(63) Continuation of application No. PCT/CN2013/081603, filed on Aug. 16, 2013.

(30) Foreign Application Priority Data

Dec. 28, 2012  (CN) .......................... 2012 1 0586408

(51) Int. Cl.
*H04L 12/741*      (2013.01)
*H04L 12/46*       (2006.01)
(Continued)

(52) U.S. Cl.
CPC .......... *H04L 45/74* (2013.01); *H04L 12/4633* (2013.01); *H04L 61/2503* (2013.01); *H04L 2012/5652* (2013.01)

(58) Field of Classification Search
CPC ...................................... H04L 45/74
See application file for complete search history.

(56) References Cited

U.S. PATENT DOCUMENTS 6,457,061 B1 * 9/2002 Bal ................... H04L 29/12009
709/245
8,595,794 B1 * 11/2013 Van ....................... H04L 67/141
380/247

(Continued)

FOREIGN PATENT DOCUMENTS

CN    101188542    5/2008
CN    101471899    7/2009

OTHER PUBLICATIONS

International Search Report issued in corresponding application PCT/CN2013/081603, dated Nov. 21, 2013, pp. 1-7.

*Primary Examiner* — Andrew Lai
*Assistant Examiner* — Sumitra Ganguly

(57) ABSTRACT

A packet processing method and a background server are provided. The packet processing method includes: receiving, by a bearer system of a background server, an IPIP packet sent by an access server via an IP tunnel; and removing a reverse proxy IP address and a windows server IP address that are in an outer layer of the IPIP packet, and changing a destination IP address in the IPIP packet, of which the reverse proxy IP address and the windows server IP address are removed, into the windows server IP address, to obtain an IP packet.

17 Claims, 6 Drawing Sheets

--- a bearer system of a background server receives an IPIP packet sent by an access server via an IP tunnel — 201 a reverse proxy IP address and a windows server IP address that are in an outer layer of the IPIP packet are removed, a destination IP address in the IPIP packet of which the reverse proxy IP address and the windows server IP address are removed is changed into the windows server IP address, and an IP packet is generated based on the IPIP packet whose destination IP address being changed into the windows server IP server — 202

(51) Int. Cl.
  *H04L 29/12*    (2006.01)
  *H04L 12/70*    (2013.01)

(56) References Cited

U.S. PATENT DOCUMENTS

| | | | |
|---|---|---|---|
| 2002/0103940 A1* | 8/2002 | Sullivan | H04L 29/06 709/250 |
| 2007/0280247 A1 | 12/2007 | Mera et al. | |
| 2009/0059788 A1* | 3/2009 | Granovsky | H04L 47/10 370/235 |
| 2011/0032868 A1* | 2/2011 | Huang | H04L 12/4633 370/328 |
| 2011/0282926 A1* | 11/2011 | Amemiya | H04L 12/66 709/201 |
| 2013/0007109 A1* | 1/2013 | Matsuhira | H04L 67/1002 709/203 |
| 2013/0010614 A1* | 1/2013 | Lin | H04L 12/2898 370/250 |
| 2013/0254264 A1* | 9/2013 | Hankinson | H04L 29/06047 709/203 |
| 2014/0064246 A1* | 3/2014 | Baillargeon | H04L 61/2592 370/331 |
| 2015/0055507 A1* | 2/2015 | Korhonen | H04L 12/4633 370/254 |

\* cited by examiner

| Data | |
|---|---|
| Client port | Destination port |
| Client IP address | Destination IP address |
| Reverse proxy IP address | Windows server IP address |

FIG. 3a

| Data | |
|---|---|
| Client port | Destination port |
| Client IP address | Windows server IP address |

FIG. 3b

PACKET PROCESSING METHOD AND BACKGROUND SERVER

RELATED APPLICATION

This application is a continuation application of International Application No. PCT/CN2013/081603, entitled "DATA PACKET PROCESSING METHOD AND DAEMON SERVER" and filed on Aug. 16, 2013, which claims priority to Chinese Patent Application No. 201210586408.2, filed with the Chinese Patent Office on Dec. 28, 2012, and entitled "PACKET PROCESSING METHOD AND BACKGROUND SERVER", which are incorporated herein by reference in their entireties.

FIELD OF THE TECHNOLOGY

The present disclosure relates to network communications technologies, and in particular, to a packet processing method and a background server.

BACKGROUND OF THE DISCLOSURE

A Linux server clustering system (Linux Virtual Server, LVS for short) is a virtual server clustering system, and is a way for achieving load balancing, in the Linux kernel, based on the Internet Protocol (IP for short) layer and the content-based request distribution.

A Tencent Gateway (TGW for short) project is developed from an LVS project. By using an IP tunneling (IP TUN for short) manner, a TGW can access a service on a Linux server efficiently and transparently. However, since a windows system does not support the IP TUN technology, it is hard to make the TGW access a windows service by using the IP TUN manner.

SUMMARY

In view of the foregoing problem, embodiments of the present application provide a packet processing method and a background server that process a windows service accessed via an IP tunnel.

In one aspect of the present disclosure, a packet processing method is provided, including:

receiving, by a bearer system of a background server, an Internet Protocol over Internet Protocol (IPIP) packet sent by an access server via an Internet Protocol (IP) tunnel; and removing, by the bearer system, a reverse proxy IP address and a windows server IP address that are in an outer layer of the IPIP packet;

changing, by the bearer system, a destination IP address in the IPIP packet, of which the reverse proxy IP address and the windows server IP address are removed, into the windows server IP address; and generating, by the bearer system, an IP packet based on the IPIP packet whose destination IP address has been changed into the windows server IP server.

In the foregoing packet processing method, a windows system of the background server is installed on the bearer system.

The processing method may further include: sending, by the bearer system, the IP packet to the windows system on the background server.

In an embodiment of the present application, the packet processing method further includes:

searching, by the bearer system, based on a client port, a destination port, a client IP address, and the windows server IP address in the IPIP packet, a connection list for a connection entry corresponding to the IPIP packet; and adding, by the bearer system, if the connection entry corresponding to the IPIP packet is not found in the connection list, the connection entry corresponding to the IPIP packet into the connection list.

The client port, the destination port, the client IP address, the windows server IP address, the destination IP address, and the reverse proxy IP address of the IPIP packet are saved, by the bearer system, in the connection entry.

In another aspect of the present disclosure, a packet processing method is provided, including:

receiving, by a bearer system of a background server, a first IP packet sent by a windows system of the background server, the windows system being installed on the bearer system;

changing a windows server IP address in the first IP packet into an acquired destination IP address, to obtain a second IP packet; and encapsulating the windows server IP address and an acquired reverse proxy IP address into an outer layer of the second IP packet, to obtain an IPIP packet.

According to an implementation solution, the method further includes sending the IPIP packet to a reverse proxy server.

In an embodiment of the present application, before the changing a windows server IP address in the first IP packet into an acquired destination IP address, to obtain a second IP packet, the method includes:

searching a connection list, and determining whether the connection list includes a connection entry corresponding to the first IP packet; and acquiring, if the connection list includes the connection entry corresponding to the first IP packet, the reverse proxy IP address and the destination IP address of the first IP packet from the connection entry corresponding to the first IP packet.

In an embodiment of the present application, the processing method further includes:

discarding the first IP packet if the connection entry corresponding to the first IP packet is not included in the connection list.

In further another aspect of the present disclosure, a background server is provided, the background server includes a bearer system module, and the bearer system module includes:

a receiving unit, used to receive an IPIP packet sent by an access server via an IP tunnel; and a processing unit, used to remove a reverse proxy IP address and a windows server IP address that are in an outer layer of the IPIP packet, and change a destination IP address in the IPIP packet, of which the reverse proxy IP address and the windows server IP address are removed, into the windows server IP address, to obtain an IP packet.

According to an implementation solution, the background server further includes a windows system module, and the bearer system module further includes a sending unit used to send, after the processing unit obtains the IP packet, the IP packet to the windows system module.

In an embodiment of the present application, the bearer system module further includes:

a searching unit, used to search, based on a client port, a destination port, a client IP address, and the windows server IP address in the IPIP packet, a connection list for a connection entry corresponding to the IPIP packet; and an adding unit, used to add the connection entry corresponding to the IPIP packet into the connection list, if the searching unit does not find the connection entry corresponding to the IPIP packet in the connection list.

The client port, the destination port, the client IP address, the windows server IP address, the destination IP address, and the reverse proxy IP address of the IPIP packet are saved in the connection entry.

In still another aspect of the present disclosure, a background server is provided, the background server includes a bearer system module, and the bearer system module includes:

a packet receiving unit, used to receive a first IP packet sent by a windows system; and a changing and encapsulation unit, used to change a windows server IP address in the first IP packet into an acquired destination IP address, to obtain a second IP packet; and encapsulate the windows server IP address and an acquired reverse proxy IP address into an outer layer of the second IP packet, to obtain an IPIP packet.

According to an implementation solution of the present disclosure, the background server further includes a windows system module used to send the first IP packet, and the bearer system module further includes a packet sending unit used to send, after the changing and encapsulation unit obtains the IPIP packet, the IPIP packet to a reverse proxy server.

In an embodiment of the present application, the bearer system module further includes:

a searching and determining unit, used to search a connection list, and determine whether the connection list includes a connection entry corresponding to the first IP packet; and an acquisition unit, used to acquire, if the searching and determining unit determines that the connection list includes the connection entry corresponding to the first IP packet, the reverse proxy IP address and the destination IP address of the first IP packet, from the connection entry corresponding to the first IP packet.

In an embodiment of the present application, the bearer system module further includes:

a discarding unit, used to discard the first IP packet, if the searching and determining unit determines that the connection entry corresponding to the first IP packet is not included in the connection list.

BRIEF DESCRIPTION OF THE DRAWINGS

To describe technical solutions in embodiments of the present application more clearly, the following briefly introduces the accompanying drawings for describing the embodiments.

FIG. 3a is a structural diagram of an IPIP packet according to an embodiment of the present application;

FIG. 3b is a structural diagram of an IP packet according to an embodiment of the present application;

DETAILED DESCRIPTION OF EMBODIMENTS

The following clearly and completely describes technical solutions in embodiments of the present application in conjunction with the accompanying drawings. Apparently, the described embodiments are a part rather than all of the embodiments of the present application. All other embodiments obtained by a person of ordinary skill in the art based on the embodiments of the present application without creative efforts shall fall within the protection scope of the present disclosure.

Embodiments of the present application provide a packet processing method and a background server, where a bearer system of the background server processes a received IPIP packet to obtain an IP packet, and sends the obtained IP packet to a windows system of the background server, so that a windows service can be accessed by a TGW via an IP tunnel.

Figure 1:
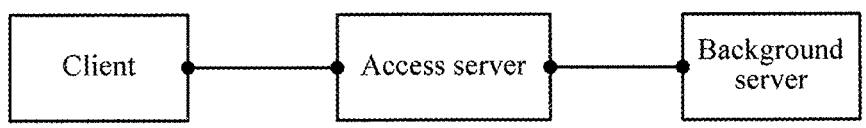
FIG. 1 is a schematic structural diagram of a windows service access system according to an embodiment of the present application.

To understand the technical solutions in the embodiments of the present application better, a windows service access system applicable to the technical solutions of the present disclosure is described below. As shown in FIG. 1, a windows service access system according to an embodiment of the present application includes: a client, an access server, and a background server (i.e., a backend server), where data is transmitted between the access server and the background server via an IP tunnel, a bearer system is installed on the background server, and a windows system is installed on the bearer system. The client may initiate a windows service request, and may send the windows service request to the access server. According to a destination IP address in a header of an IP packet in the received service request, the access server determines a reverse proxy IP address and a windows server IP address of the IP packet; and the access server encapsulates the determined reverse proxy IP address and windows server IP address into an outer layer of the IP packet, to obtain an IPIP packet, and sends the IPIP packet to the background server via the IP tunnel. The bearer system of the background server receives the IPIP packet, processes the IPIP packet to obtain an IP packet, and delivers the IP packet obtained by the processing to the windows system on the background server. The windows system processes the received IP packet, and may further feed back an IP packet to the client subsequently. The IP packet, which is fed back by the windows system, is sent to the bearer system of the background server. After receiving the IP packet which is fed back by the windows system, the bearer system performs an encapsulation processing on the IP packet, to obtain an IPIP packet, and feeds back the obtained IPIP packet to the access server. The access server performs a removing processing on a header of the IPIP packet to obtain an IP packet and then sends the obtained IP packet to the client.

It should be noted that according to an exemplary embodiment of the present application, the service request may be a request to establish a connection, or a request to transmit data, or a request to close a connection, or the like.

It should be noted that according to an exemplary embodiment of the present application, the background server may be a part of a TGW system, and serves the TGW system. Certainly, the present disclosure is not limited in this aspect.

It should be noted that according to an exemplary embodiment of the present application, the bearer system may be a Linux Xen system, or may be another system that can carry a windows system, and the present disclosure is not limited in this aspect.

By using the processing manner described above, in the windows service access system according to this embodiment of the present application, a windows service can be effectively accessed by a background server; and particularly, for a condition that the background server is a part of a TGW system, the windows service can be accessed by the TGW system.

Figure 2:
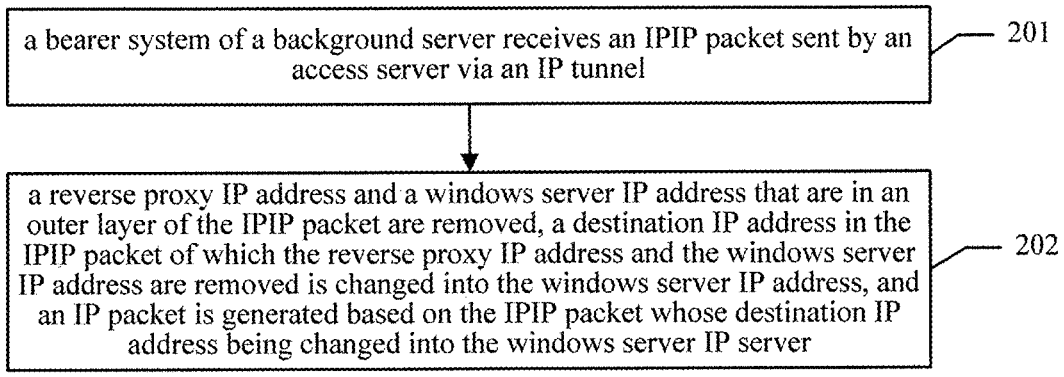
FIG. 2 is a schematic diagram of a packet processing method according to an embodiment of the present application.

A process in which a bearer system of a background server processes an IPIP packet is described in detail below. As shown in FIG. 2, according to an embodiment of the present application, a packet processing method includes steps 201 to 202.

In step 201, a bearer system of a background server receives an IPIP packet sent by an access server via an IP tunnel.

In an exemplary implementation solution of the present disclosure, the bearer system is installed on the background server, and a windows system is further installed on the bearer system. The IPIP packet sent by the access server via the IP tunnel is delivered to the bearer system of the background server and is processed by the bearer system, and the processed packet may be delivered to the windows system of the background server.

In step 202, a reverse proxy IP address and a windows server IP address that are contained in an outer layer of the IPIP packet are removed; a destination IP address in the IPIP packet of which the reverse proxy IP address and the windows server IP address have been removed is changed into the windows server IP address; and an IP packet is generated based on the IPIP packet whose destination IP address has been changed into the windows server IP server.

In an embodiment of the present application, the reverse proxy IP address and the windows server IP address may be included in a header of the IPIP packet.

According to an exemplary implementation, the reverse proxy IP address may be an IP address of an access machine used to return data to a client, and the windows server IP address may be an IP address of a windows server on the bearer system.

In another embodiment, the header of the IPIP packet may further include, but be not limited to, a client port, a destination port, a client IP address, the destination IP address, and the like.

For example, the port may be a port for a Transmission Control Protocol (TCP) communications service. In this implementation solution, the client port may be a TCP port used by the client when establishing a connection with a server; and the destination port may be a service port open for the client.

In an exemplary implementation solution, the client IP address may be an IP address used by the client when establishing a connection with a server; and the destination IP address may be an IP address of a server open for the client.

In the embodiment of the present application, the bearer system removes from the received IPIP packet the reverse proxy IP address and the windows server IP address that are contained in the outer layer of the received IPIP packet, and changes the destination IP address in the IPIP packet where the reverse proxy IP address and the windows server IP address have been removed, into the windows server IP address to obtain an IP packet.

According to another implementation solution of the present disclosure, the obtained IP packet may be sent to the windows system on the background server.

In the implementation solution, after obtaining the IP packet, the bearer system sends the IP packet to the windows system on the background server, and the windows system processes the IP packet. The reverse proxy IP address and the destination IP address are not included in the IP packet. Therefore, the windows system can process the IP packet, so that by using the foregoing packet processing method, a windows service may be accessed by a TGW via an IP tunnel.

In another implementation solution of the present disclosure, after receiving the IPIP packet, the bearer system of the background server may further search a connection list based on the client port, the destination port, the client IP address, and the windows server IP address in the IPIP packet. The connection list includes connection entries corresponding to IP packets in service requests sent by users, and each connection entry includes a client port, a destination port, a client IP address, a destination IP address, a reverse proxy IP address, and a windows server IP address in an IPIP packet received by the bearer system.

In the embodiment of the present application, the bearer system searches the connection list based on the client port, the destination port, the client IP address, and the windows server IP address in the IPIP packet, and determines whether a connection entry corresponding to the IPIP packet is saved in the connection list. If a connection entry including the client port, the destination port, the client IP address, and the windows server IP address of the IPIP packet is not found in the connection list, it is determined that the connection entry corresponding to the IPIP packet is not included in the connection list, and the bearer system adds, in the connection list, the connection entry corresponding to the IPIP packet.

It should be noted that in the embodiment of the present application, the connection list saved in the bearer system may further include a connection state for representing a state of a connection initiated by a user. The connection state may be a three-step handshake connection establishing state, or a state indicating that a connection is established, or a state indicating that a connection is closed, so that when a user initiates a malicious attack, an attack packet sent by the user can be effectively identified, thereby improving security and stability of the system.

In the embodiment of the present application, after receiving the IPIP packet sent by the access server via the IP tunnel, the bearer system of the background server removes from the IPIP packet the reverse proxy IP address and the windows server IP address that are contained in the outer layer of the IPIP packet, and changes the destination IP address into the windows server IP address to obtain an IP packet. The obtained IP packet may subsequently be sent to the windows system, so that a windows service may be accessed by a TGW via an IP tunnel.

In order to better understand the processing on packets in the present disclosure, reference may be made to packet structures exemplarily shown in FIG. 3a and FIG. 3b. FIG.

3a is a structural diagram of an IPIP packet according to an embodiment of the present application; and FIG. 3b is a structural diagram of an IP packet according to an embodiment of the present application. As shown in FIG. 3a, the IPIP packet includes a reverse proxy IP address, a windows server IP address, and a destination IP address. As described above, a background server may process the IPIP packet shown in FIG. 3a, and remove the reverse proxy IP address and the windows server IP address from the IPIP packet. In addition, the background server further changes the destination IP address in the IPIP packet into the windows server IP address. An IP packet after such packet processing may be shown in FIG. 3b. Certainly, packet structures shown in FIG. 3a and FIG. 3b are only exemplary and are not limited to that shown and described in the present disclosure.

Figure 4:
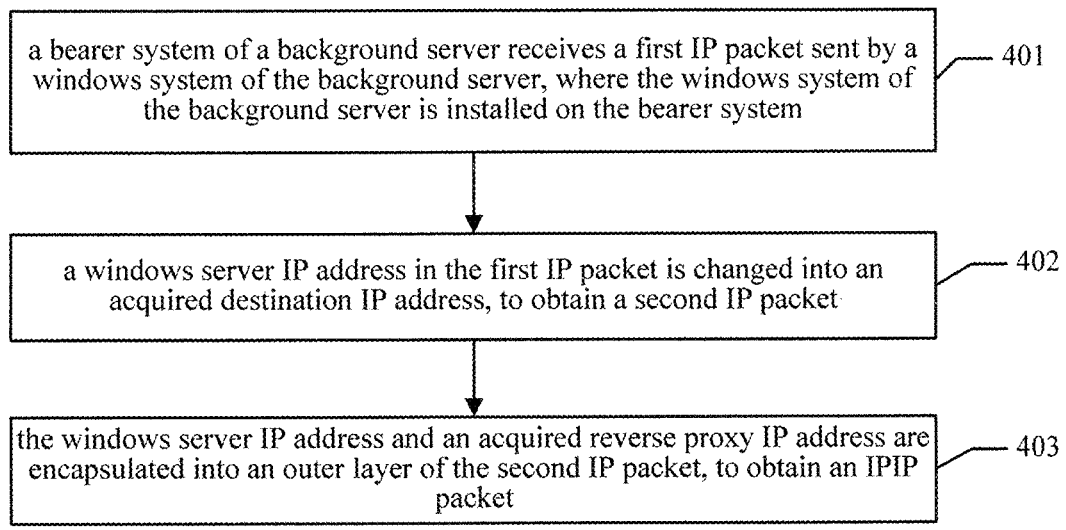
FIG. 4 is a schematic diagram of a packet processing method according to an embodiment of the present application.

A method for processing, by a bearer system of a background server, a received IP packet sent by a windows system is described in detail below. As shown in FIG. 4, a packet processing method according to an embodiment of the present application includes steps 401 to 403.

In step 401, a bearer system of a background server receives a first IP packet sent by a windows system of the background server, where the windows system is installed on the bearer system.

The windows system of the background server may send an IP packet. For example, after receiving an IP packet sent by the bearer system, the windows system processes the IP packet, to obtain an IP packet to be fed back to a user terminal (i.e., a client), and the IP packet to be fed back to the user terminal may be referred to as the first IP packet. The windows system feeds back the first IP packet to the bearer system, and therefore, the bearer system receives the first IP packet sent by the windows system of the background server. According to an exemplary implementation, the first IP packet includes a windows server IP address. According to another exemplary implementation, a destination port, a client port, a client IP address, and a windows server IP address of the first IP packet may be included in a header of the first IP packet.

In step 402, a windows server IP address in the first IP packet is changed by the bearer system, into an acquired destination IP address to obtain a second IP packet.

In step 403, the windows server IP address and an acquired reverse proxy IP address are encapsulated into an outer layer of the second IP packet to obtain an IPIP packet.

In the embodiment of the present application, the bearer system determines the reverse proxy IP address and the destination IP address of the received first IP packet sent by the windows system. For example, the bearer system may search a saved connection list based on the destination port, the client port, the destination IP address, and the windows server IP address in the header of the first IP packet, and determines whether a connection entry corresponding to the first IP packet is saved in the connection list. If the connection list includes a connection entry including all of the destination port, the client port, the destination IP address, and the windows server IP address in the header of the first IP packet, it is determined that the connection list includes the connection entry corresponding to the first IP packet, and the reverse proxy IP address and the destination IP address of the first IP packet are acquired from the connection entry corresponding to the first IP packet.

After acquiring the reverse proxy IP address and the destination IP address of the first IP packet, the bearer system changes the windows server IP address in the first IP packet into the acquired destination IP address, to obtain the second IP packet, and encapsulates the windows server IP address and the acquired reverse proxy IP address into an outer layer of the second IP packet to obtain an IPIP packet.

It should be noted that in the embodiment of the present application, if the bearer system does not find, from the connection list, a connection entry including all of the destination port, the client port, the destination IP address, and the windows server IP address in the header of the first IP packet, it is determined that the connection list does not include the connection entry corresponding to the first IP packet, and the bearer system discards the first IP packet.

In an embodiment of the present application, the reverse proxy IP address and the windows server IP address may be included in a header of the IPIP packet.

According to an exemplary implementation, the reverse proxy IP address may be an IP address of an access machine used to return data to a client; and the windows server IP address may be an IP address of a windows server on the bearer system.

In another embodiment, the header of the IPIP packet may further include the client port, the destination port, the client IP address, the destination IP address, and the like, and the present disclosure is not limited in this aspect.

For example, the port may be a port for a TCP communications service. In this implementation solution, the client port may be a TCP port used by the client when establishing a connection with a server; and the destination port may be a service port open for the client.

In an exemplary implementation solution, the client IP address may be an IP address used by the client when establishing a connection with a server; and the destination IP address may be an IP address of a server open for the client.

The IPIP packet obtained by using the packet processing method may be sent to a reverse proxy server or an access server.

According to an exemplary implementation solution of the present disclosure, after acquiring the IPIP packet, the bearer system may send the IPIP packet to the reverse proxy server. Because the IPIP packet includes the reverse proxy IP address, the bearer system sends the IPIP packet to a corresponding reverse proxy server according to the reverse proxy IP address in the IPIP packet. After receiving the IPIP packet, the reverse proxy server may remove the reverse proxy IP address and the windows server IP address in the header of the IPIP packet header, to obtain an IP packet, and feeds back the obtained IP packet to a client, so that the client can receive data fed back by a TGW.

According to the packet processing method provided in the embodiment of the present application, the bearer system of the background server changes, after receiving the first IP packet sent by the windows system of the background server, the windows server IP address in the first IP packet into the acquired destination IP address to obtain the second IP packet, and encapsulates the windows server IP address and the acquired reverse proxy IP address into the outer layer of the second IP packet to obtain the IPIP packet.

The IPIP packet may be sent to the reverse proxy server via an IP tunnel, so that the reverse proxy server may obtain, by using the IPIP packet, an IP packet to be sent to the client, thereby implementing data interaction between the client and the TGW, so that a windows service can be accessed by the TGW via the IP tunnel.

Figure 5:
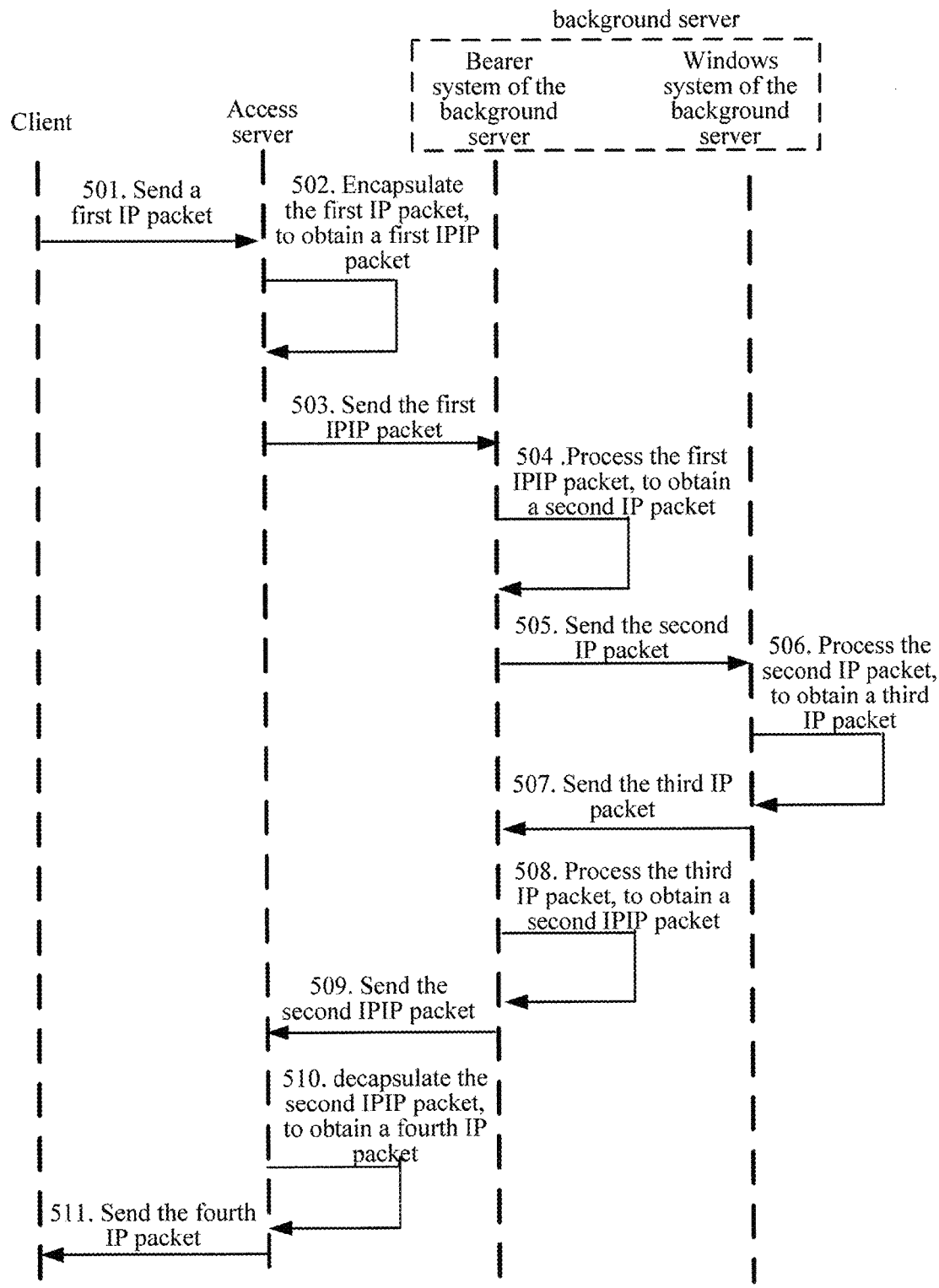
FIG. 5 is a schematic diagram of an interaction process of packets in a windows service access system according to an embodiment of the present application.

To understand the technical solution in the embodiment of the present application better, reference can be made to FIG. 5. FIG. 5 shows an interaction process of packets in the windows service access system shown in FIG. 1, according to an exemplary implementation solution of the present disclosure.

In step 501, a client terminal sends a first IP packet to an access server.

In step 502, the access server performs an encapsulation processing on the first IP packet to obtain a first IPIP packet.

In step 503, the access server sends the first IPIP packet to a bearer system of a background server.

In an embodiment of the present application, the client may send a windows service request to the access server, where the service request includes the first IP packet. The access server determines a reverse proxy IP address and a windows server IP address corresponding to the first IP packet, and encapsulates the determined reverse proxy IP address and windows server IP address into an outer layer of the first IP packet in the windows service request, to obtain the first IPIP packet.

In step 504, the bearer system of the background server processes the first IPIP packet to obtain a second IP packet.

For example, the bearer system of the background server may process the first IPIP packet by using the method shown in FIG. 2, to obtain the second IP packet. Certainly, the present disclosure is not limited to this aspect.

In step 505, the bearer system of the background server sends the second IP packet to a windows system of the background server.

In step 506, the windows system of the background server processes the second IP packet, to obtain a third IP packet.

In an embodiment of the present application, after the second IP packet is sent to the windows system, the windows system may identify the packet, and process the second IP packet, to obtain the third IP packet to be fed back.

In step 507, the windows system of the background server sends the third IP packet to the bearer system of the background server.

In step 508, the bearer system of the background server processes the third IP packet to obtain a second IPIP packet.

For example, the bearer system of the background server may process the third IP packet by using the method shown in FIG. 4, to obtain the second IPIP packet. Certainly, the present disclosure is not limited to this aspect.

In step 509, the bearer system of the background server sends the second IPIP packet to the access server.

In step 510, the access server performs a decapsulation processing on the second IPIP packet to obtain a fourth IP packet.

In step 511, the access server sends the fourth IP packet to the client.

In the embodiment of the present application, the access server performs the decapsulation processing on the received second IPIP packet to obtain the fourth IP packet, and sends the fourth IP packet to the client.

Figure 6:
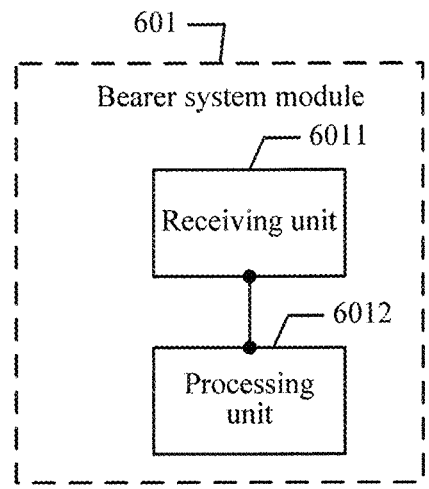
FIG. 6 is a schematic structural diagram of a background server according to an embodiment of the present application.

As shown in FIG. 6, a background server according to an embodiment of the present application includes a bearer system module 601.

The bearer system module 601 includes:

a receiving unit 6011 that receives an IPIP packet sent by an access server via an IP tunnel; and a processing unit 6012 that removes a reverse proxy IP address and a windows server IP address that are in an outer layer of the IPIP packet, and that changes a destination IP address in the IPIP packet, of which the reverse proxy IP address and the windows server IP address are removed, into the windows server IP address to obtain an IP packet.

Figure 7:
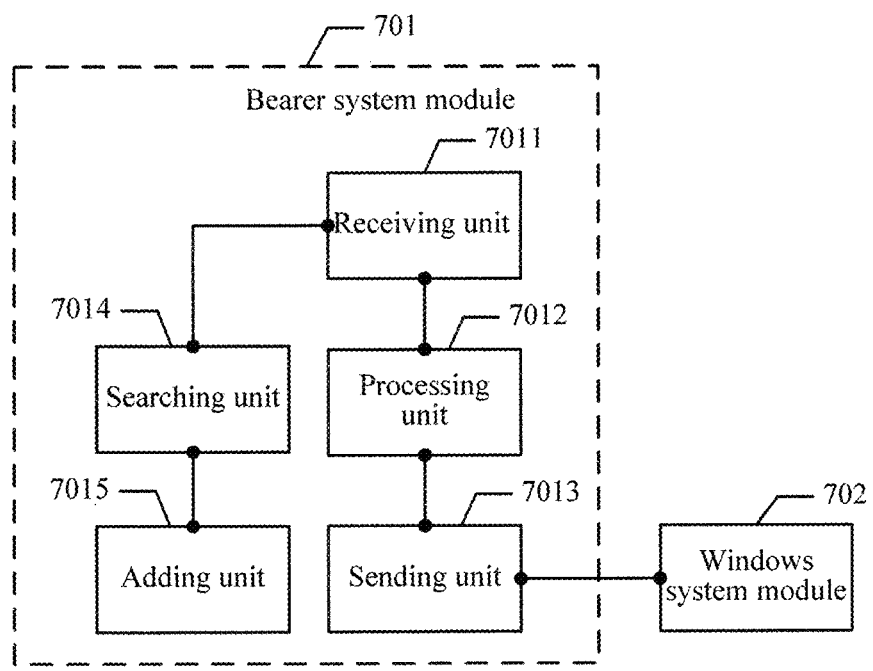
FIG. 7 is a schematic structural diagram of a background server according to another embodiment of the present application.

FIG. 7 shows a structure of a background server according to another embodiment of the present application. The background server includes a bearer system module 701 and a windows system module 702. The bearer system module 701 includes a receiving unit 7011 and a processing unit 7012, and structures and functions thereof are respectively similar to those of the receiving unit 6011 and the processing unit 6012, and are not described herein again in detail.

The bearer system module 701 further includes a sending unit 7013 that sends an IP packet from the processing unit 7012 to the windows system module 702.

The bearer system module 701 further includes:

a searching unit 7014 that searches, based on a client port, a destination port, a client IP address, and a windows server IP address in an IPIP packet, a connection list for a connection entry corresponding to the IPIP packet; and an adding unit 7015 that adds, if the searching unit does not find the connection entry corresponding to the IPIP packet in the connection list, the connection entry corresponding to the IPIP packet into the connection list, where the client port, the destination port, the client IP address, the windows server IP address, a destination IP address, and a reverse proxy IP address of the IPIP packet are saved in the connection entry.

In the embodiment of the present application, after the receiving unit 7011 in the bearer system module 701 in the background server receives an IPIP packet sent by an access server via an IP tunnel, the processing unit 7012 removes a reverse proxy IP address and a windows server IP address that are in an outer layer of the received IPIP packet, and changes a destination IP address in the IPIP packet, of which the reverse proxy IP address and the windows server IP address have been removed, into the windows server IP address to obtain an IP packet; and the sending unit 7013 sends the obtained IP packet to the windows system module 702.

In the embodiment of the present application, after the receiving unit 7011 in the bearer system module 701 receives the IPIP packet sent by the access server via the IP tunnel, the searching unit 7014 may search, based on the client port, the destination port, the client IP address, and the windows server IP address in the received IPIP packet, the connection list for a connection entry corresponding to the IPIP packet. If the searching unit 7014 does not find, in the connection list, the connection entry corresponding to the IPIP packet, the adding unit 7015 adds the connection entry corresponding to the IPIP packet into the connection list, where the client port, the destination port, the client IP address, the windows server IP address, the destination IP address, and the reverse proxy IP address of the IPIP packet are saved in the connection entry.

According to the embodiment of the present application, after receiving an IPIP packet sent by the access server via the IP tunnel, the bearer system of the background server removes the reverse proxy IP address and the windows server IP address that are in the outer layer of the IPIP packet, changes the destination IP address into the windows server IP address to obtain an IP packet, and sends the obtained IP packet to a windows system, so that a windows service can be accessed effectively by a TGW via an IP tunnel.

Figure 8:
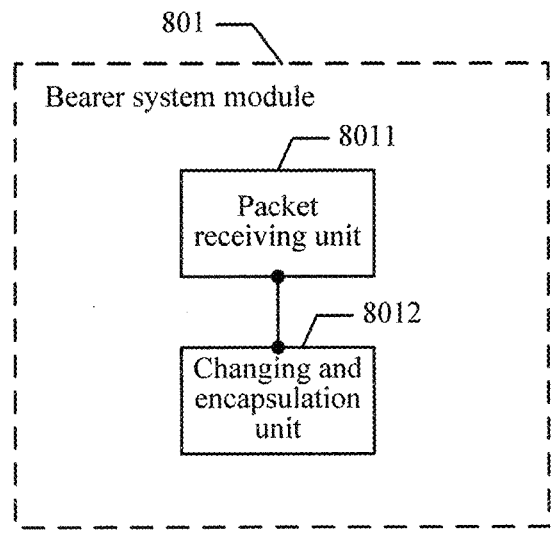
FIG. 8 is a schematic structural diagram of a background server according to still another embodiment of the present application.

As shown in FIG. 8, a background server according to an embodiment of the present application includes a bearer system module 801.

The bearer system module 801 includes:

a packet receiving unit 8011, used to receive a first IP packet sent by a windows system; and a changing and encapsulation unit 8012, used to change a windows server IP address in the first IP packet into an acquired destination IP address to obtain a second IP packet, and encapsulate the windows server IP address and an acquired reverse proxy IP address into an outer layer of the second IP packet to obtain an IPIP packet.

Figure 9:
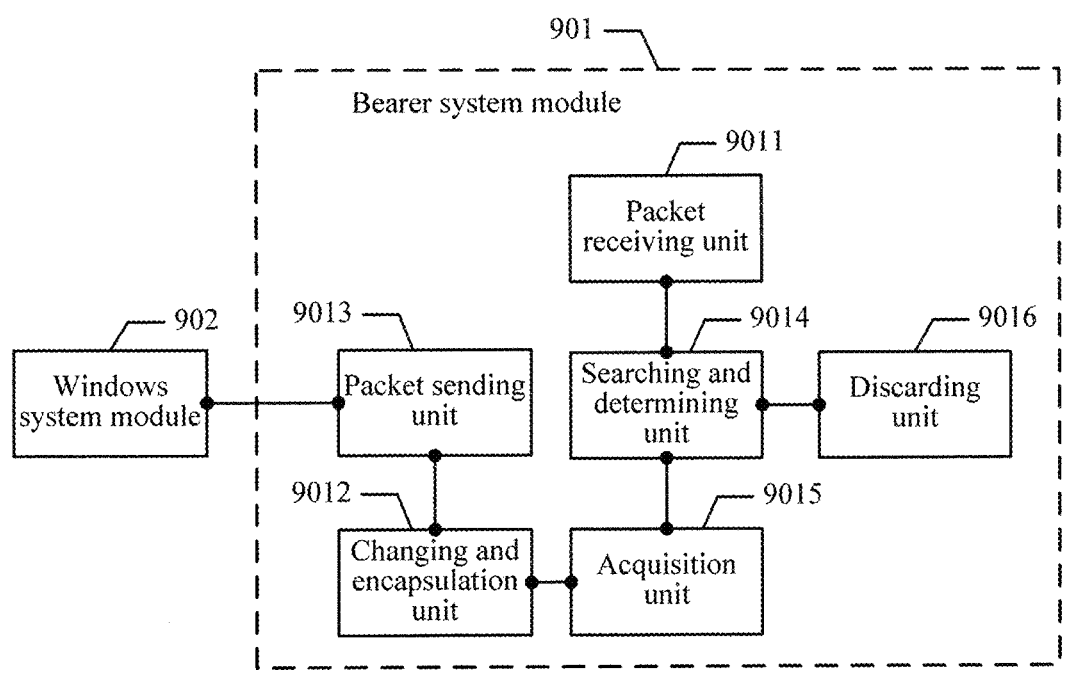
FIG. 9 is a schematic structural diagram of a background server according to yet another embodiment of the present application.

FIG. 9 shows a structure of a background server according to an embodiment of the present application. The background server includes a bearer system module 901 and a windows system module 902. The bearer system module 901 includes a packet receiving unit 9011 and a changing and encapsulation unit 9012, and structures and functions thereof are respectively similar to those of the packet receiving unit 8011 and the changing and encapsulation unit 8012, and are not described herein again in detail.

In addition, the bearer system module 901 further includes a packet sending unit 9013, used to send an IPIP packet to the windows system module 902.

The bearer system module 901 may further include:

a searching and determining unit 9014, used to search a connection list, and determine whether the connection list includes a connection entry corresponding to a first IP packet;

an acquisition unit 9015, used to acquire, if the searching and determining unit 9014 determines that the connection list includes the connection entry corresponding to the first IP packet, a reverse proxy IP address and a destination IP address of the first IP packet, from the connection entry corresponding to the first IP packet; and a discarding unit 9016, used to discard the first IP packet if the searching and determining unit 9014 determines that the connection entry corresponding to the first IP packet is not included in the connection list.

In the embodiment of the present application, the background server includes: the bearer system module 901 and the windows system module 902. After the packet receiving unit 9011 in the bearer system module 901 receives the first IP packet sent by the windows system module 902, the searching and determining unit 9014 searches the connection list and determines whether the connection list includes a connection entry corresponding to the first IP packet. If the searching and determining unit 9014 determines that the connection list includes the connection entry corresponding to the first IP packet, the acquisition unit 9015 acquires, from the connection entry corresponding to the first IP packet, the reverse proxy IP address and the destination IP address of the first IP packet. The changing and encapsulation unit 9012 then changes the windows server IP address in the first IP packet into the acquired destination IP address, to obtain a second IP packet, and encapsulates the windows server IP address and the acquired reverse proxy IP address into an outer layer of the second IP packet to obtain an IPIP packet. The packet sending unit 9013 then sends, after the changing and encapsulation unit 9012 obtains the IPIP packet, the IPIP packet to a reverse proxy server. In addition, if the searching and determining unit 9014 determines that the connection entry corresponding to the first IP packet is not included in the connection list, the discarding unit 9016 discards the first IP packet.

In addition, an embodiment of the present application further provides a program product in which processor readable instructions are stored. When the instruction code is read and executed by a processor, the processor is caused to execute the foregoing packet processing method. Correspondingly, various storage media such as a magnetic disk, an optical disc, a magneto-optical disk, and a semiconductor memory, for carrying this program product are also included in the present disclosure.

The foregoing machine readable storage media include, but are not limited to: various memories and storage units, a semiconductor device, a magnetic unit such as an optical disc, a magnetic disk, and a magneto-optical disk, and other media suitable for storing information.

In the context of this specification, a computer-available or computer readable medium may be any medium that can include, store, or spread a program for being used by any one or any combination of an instruction execution system, an apparatus, or a device.

A person of ordinary skill in the art may understand that all or some of the steps in the methods of the embodiments may be implemented by related hardware instructed by a program. The program may be stored in a computer readable storage medium. The storage medium may be a read-only memory, a magnetic disk, an optical disc, or the like.

The packet processing methods and the background servers provided in the present disclosure are described in detail above, and a person of ordinary skill in the art may make modifications both to a specific implementation manner and an application range according to the spirit of the embodiments of the present application. In summary, content of this specification should not be understood as a limitation to the present disclosure.

What is claimed is:

1. A packet processing method, comprising:
receiving, by a bearer system of a background server, an Internet Protocol over Internet Protocol (IPIP) packet, the IPIP packet being sent by an access server via an Internet Protocol (IP) tunnel, the IPIP packet including a reverse proxy IP address and a windows server IP address in an outer layer; and
removing, by the bearer system, the reverse proxy IP address and the windows server IP address from the IPIP packet;
changing, by the bearer system, a destination IP address in the IPIP packet, of which the reverse proxy IP address and the windows server IP address have been removed, into the windows server IP address; and
generating, by the bearer system, an IP packet based on the IPIP packet whose destination IP address has been changed into the windows server IP address.

2. The method according to claim 1, wherein a windows system of the background server is installed on the bearer system.

3. The method according to claim 2, further comprising:
sending, by the bearer system, the IP packet to the windows system on the background server.

4. The method according to claim 1, further comprising:
searching, by the bearer system, based on a client port, a destination port, a client IP address, and the windows server IP address in the IPIP packet, a connection list for a connection entry corresponding to the IPIP packet; and
adding, by the bearer system, if the connection entry corresponding to the IPIP packet is not found in the connection list, the connection entry corresponding to the IPIP packet into the connection list.

5. The method according to claim 4, wherein the client port, the destination port, the client IP address, the windows server IP address, the destination IP address, and the reverse proxy IP address of the IPIP packet are saved, by the bearer system, in the connection entry.

6. A packet processing method, comprising:
  receiving, by a bearer system of a background server, a first IP packet sent by a windows system of the background server, the windows system being installed on the bearer system;
  changing, by the bearer system, a windows server IP address in the first IP packet into an acquired destination IP address, to obtain a second IP packet; and
  encapsulating, by the bearer system, the windows server IP address and an acquired reverse proxy IP address into an outer layer of the second IP packet, to obtain an IPIP packet.

7. The method according to claim 6, further comprising: sending, by the bearer system, the IPIP packet to a reverse proxy server.

8. The method according to claim 6, wherein before the changing a windows server IP address in the first IP packet into an acquired destination IP address to obtain a second IP packet, the method further comprises:
  searching, by the bearer system, a connection list, and determining whether the connection list comprises a connection entry corresponding to the first IP packet; and
  acquiring by the bearer system, if the connection list comprises the connection entry corresponding to the first IP packet, the reverse proxy IP address and the destination IP address of the first IP packet from the connection entry corresponding to the first IP packet.

9. The method according to claim 8, further comprising:
  discarding, by the bearer system, the first IP packet if the connection entry corresponding to the first IP packet is not comprised in the connection list.

10. A background server, comprising one or more processors and a memory having a plurality of processor-executable instruction modules stored therein, wherein the instruction modules comprise:
  a bearer system module, wherein the bearer system module comprises:
    a receiving unit receiving an IPIP packet sent by an access server via an IP tunnel; and
    a processing unit removing a reverse proxy IP address and a windows server IP address in an outer layer of the IPIP packet, changing a destination IP address in the IPIP packet, of which the reverse proxy IP address and the windows server IP address have been removed, into the windows server IP address, and generating an IP packet based on the IPIP packet whose destination IP address has been changed into the windows server IP address.

11. The background server according to claim 10, wherein the instruction modules further comprise: a windows system module, wherein the bearer system module further comprises a sending unit sending the IP packet to the windows system module.

12. The background server according to claim 10, wherein the bearer system module further comprises:
  a searching unit searching, based on a client port, a destination port, a client IP address, and the windows server IP address in the IPIP packet, a connection list for a connection entry corresponding to the IPIP packet; and
  an adding unit adding the connection entry corresponding to the IPIP packet into the connection list, if the searching unit does not find the connection entry corresponding to the IPIP packet in the connection list.

13. The background server according to claim 12, wherein the client port, the destination port, the client IP address, the windows server IP address, the destination IP address, and the reverse proxy IP address of the IPIP packet are saved, by the bearer system, in the connection entry.

14. A background server, comprising one or more processors and a memory having a plurality of processor-executable instruction modules stored therein, wherein the instruction modules comprise:
  a bearer system module, wherein the bearer system module comprises:
    a packet receiving unit receiving a first IP packet sent by a windows system; and
    a changing and encapsulation unit changing a windows server IP address in the first IP packet into an acquired destination IP address to obtain a second IP packet, and encapsulating the windows server IP address and an acquired reverse proxy IP address into an outer layer of the second IP packet to obtain an IPIP packet.

15. The background server according to claim 14, wherein the instruction modules further comprise: a windows system module sending the first IP packet, wherein the bearer system module further comprises a packet sending unit sending the IPIP packet to a reverse proxy server.

16. The background server according to claim 14, wherein the bearer system module further comprises:
  a searching and determining unit searching a connection list, and determines whether the connection list comprises a connection entry corresponding to the first IP packet; and
  an acquisition unit acquiring, if the searching and determining unit determines that the connection list comprises the connection entry corresponding to the first IP packet, the reverse proxy IP address and the destination IP address of the first IP packet, from the connection entry corresponding to the first IP packet.

17. The background server according to claim 16, wherein the bearer system module further comprises:
  a discarding unit discarding the first IP packet, if the searching and determining unit determines that the connection entry corresponding to the first IP packet is not comprised in the connection list.

* * * * *